United States Patent
Kim

(10) Patent No.: US 10,891,761 B2
(45) Date of Patent: Jan. 12, 2021

(54) ADAPTIVE THREE-DIMENSIONAL SPACE GENERATION METHOD AND SYSTEM

(71) Applicant: 3I Inc., Daegu (KR)

(72) Inventor: Ken Kim, Seoul (KR)

(73) Assignee: 3I Inc., Daegu (KR)

( * ) Notice: Subject to any disclaimer, the term of this patent is extended or adjusted under 35 U.S.C. 154(b) by 0 days.

(21) Appl. No.: 16/518,580

(22) Filed: Jul. 22, 2019

(65) Prior Publication Data

US 2020/0027250 A1 Jan. 23, 2020

(30) Foreign Application Priority Data

Jul. 23, 2018 (KR) .................. 10-2018-0085371

(51) Int. Cl.
*G06T 11/00* (2006.01)
*G06T 7/00* (2017.01)

(52) U.S. Cl.
CPC .......... *G06T 11/001* (2013.01); *G06T 7/0002* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 6,201,546 B1 * | 3/2001 | Bodor | ............... | G06T 15/10 345/420 |
| 10,726,633 B2 * | 7/2020 | Deng | ............... | G06T 19/00 |
| 2005/0177350 A1 * | 8/2005 | Kishikawa | ............... | G06T 17/10 703/1 |
| 2011/0096093 A1 * | 4/2011 | Oi | ............... | G06T 19/006 345/633 |
| 2015/0358613 A1 * | 12/2015 | Sandrew | ............... | H04N 13/261 348/36 |
| 2016/0055268 A1 * | 2/2016 | Bell | ............... | G06K 9/00201 703/1 |
| 2016/0092608 A1 * | 3/2016 | Yamamoto | ............... | G06T 17/00 703/1 |
| 2017/0017830 A1 * | 1/2017 | Hanai | ............... | G06K 9/00671 |
| 2017/0053447 A1 * | 2/2017 | Chen | ............... | G06T 19/006 |
| 2017/0193693 A1 * | 7/2017 | Robert | ............... | G06K 9/00664 |
| 2018/0144535 A1 * | 5/2018 | Ford | ............... | G06T 17/20 |
| 2018/0144555 A1 * | 5/2018 | Ford | ............... | G06T 15/20 |
| 2018/0182163 A1 * | 6/2018 | Tung | ............... | G01B 11/24 |
| 2019/0289205 A1 * | 9/2019 | Lin | ............... | G06T 15/10 |
| 2019/0378332 A1 * | 12/2019 | Sun | ............... | G06T 15/04 |

FOREIGN PATENT DOCUMENTS

KR 10-2016-0126242 A 11/2016

* cited by examiner

*Primary Examiner* — Hilina K Demeter

(74) *Attorney, Agent, or Firm* — Studebaker & Brackett PC

(57) ABSTRACT

An adaptive three-dimensional space generation system and a method therefor are provided. The adaptive three-dimensional space generation method comprises allowing an adaptive three-dimensional space generation system to determine whether a space is a first-type space or a second-type space depending on structural characteristics of the space based on a plurality of images captured from different locations in the space, allowing the adaptive three-dimensional space generation system to adaptively select an image for texturing the space among the images depending on whether the space is the first-type space or the second-type space, and performing texturing of the space based on the image selected by the adaptive three-dimensional space generation system.

10 Claims, 8 Drawing Sheets

Fig. 7

| Score | Cam 1 | Cam 2 | Cam 3 |
|---|---|---|---|
| Wall 1 | | | |
| Wall 2 | | | |
| Wall 3 | | | |
| Wall 4 | | | |
| Wall 5 | | | |
| Wall 6 | | | |
| ... | | | |

Fig. 8 a. $\Theta > 88°$ → 0 point b. $\Theta > 80°$ → 1 point c. $\Theta > 70°$ → 3 point d. $\Theta < 70°$ → 6 point

US 10,891,761 B2

ADAPTIVE THREE-DIMENSIONAL SPACE GENERATION METHOD AND SYSTEM

CROSS-REFERENCE TO RELATED APPLICATION

This U.S. non-provisional patent application claims priority under 35 U.S.C. § 119 to Korean Patent Application No. 10-2018-0085371 filed on Jul. 23, 2018 in the Korean Intellectual Property Office, the contents of which are herein incorporated by reference in their entirety.

BACKGROUND

1. Technical Field

The present disclosure relates to a method and a system for generating three-dimensional modeling information on a space using images captured in the space.

2. Discussion of Related Art

There was proposed a concept for modeling images (e.g., 360-degree images) captured in a predetermined space into a three-dimensional space.

Such a technical idea is disclosed in Korean Patent Application No. 10-2016-0126242, entitled "Server and method for producing virtual reality image about object" (hereinafter referred to as "prior application") and filed by the Applicant.

The prior application discloses a technical idea of generating a floor surface using images (e.g., 360-degree images) captured in a space and generating three-dimensional modeling information of the space therefrom.

However, the prior application does not suggest a concept of efficiently performing texturing of the generated three-dimensional space.

Particularly, in the case of performing texturing of a complicated space using image information obtained only from any one captured image (e.g., image information on a wall surface and/or a floor surface), the texturing may be unnatural or the space may be distortedly displayed.

SUMMARY

In view of the above, the present disclosure provides a method and a system capable of adaptively performing texturing of a three-dimensional space depending on complexity of a space.

In order to provide the technical solution, an adaptive three-dimensional space generation method comprises allowing an adaptive three-dimensional space generation system to determine whether a space is a first-type space or a second-type space depending on structural characteristics of the space based on a plurality of images captured from different locations in the space, allowing the adaptive three-dimensional space generation system to adaptively select an image for performing texturing of the space among the images depending on whether the space is the first-type space or the second-type space, and performing texturing of the space based on the image selected by the adaptive three-dimensional space generation system.

The determining whether the space is the first-type space or the second-type space depending on the structural characteristics of the space includes determining whether the space is the first-type space or the second-type space depending on whether or not at least two criteria are satisfied among a first criterion in which the number of corners of the space is smaller than or equal to a predetermined number, a second criterion in which a ratio of an area of a plane structure of the space to an area of a minimum bounding box of the plane structure of the space is greater than or equal to a reference area ratio, a third criterion in which distances from positions corresponding to the images to all walls of the space are smaller than or equal to a predetermined distance, and a fourth criterion in which whether or not all the walls of the space are seen from the positions corresponding to the images.

The adaptively selecting the image for performing texturing of the space among the images depending on whether the space is the first-type space or the second-type space includes selecting, when the adaptive three-dimensional space generation system determines that the space is the first-type space, any one image corresponding to a position where the fourth criterion is satisfied among the images as a selected image.

The performing the texturing of the space based on the image selected by the adaptive three-dimensional space generation system includes performing texturing of the space using image information corresponding to the walls of the space included in the selected image.

In the adaptively selecting the image for performing texturing of the space among the images depending on whether the space is the first-type space or the second-type space, a plurality of images is selected among the images when the adaptive three-dimensional space generation system determines that the space is the second-type space and, in the performing the texturing of the space based on the image selected by the adaptive three-dimensional space generation system, texturing of at least a part of the walls of the space is performed based on image information extracted from different selected images.

In the adaptively selecting an image for performing texturing of the space among the images depending on whether the space is the first-type space or the second-type space, at least one image for performing texturing of the walls is selected based on at least one of a distance between the walls of the space and the positions corresponding to the images and an angle between the walls of the space and the positions corresponding to the images.

The selecting an image for performing texturing of the walls based on at least one of the distance between the walls of the space and the positions corresponding to the images and the angle between the walls of the space and the positions corresponding to the images includes selecting, as an image for performing texturing of a specific wall, at least one image in which a weight applied to the specific wall satisfies a predetermined criteria, wherein a higher weight is applied as the distances between the positions and the specific wall among the walls is shorter and as the angle between the positions and the specific wall is smaller.

The adaptively selecting an image for performing texturing of the space among the images depending on whether the space is the first-type space or the second-type space includes selecting an image for performing texturing of the floor based on distances between the positions corresponding to the images and unit areas of the floor of the space.

In accordance with another embodiment in order to solve the technical problem, an adaptive three-dimensional space generation method comprises receiving a plurality of images captured from different positions in a space into an adaptive three-dimensional space generation system, determining, based on the received images, whether or not at least two criteria are satisfied among a first criterion in which the number of corners of the space is smaller than a predetermined reference number, a second criterion in which a ratio of an area of a plane structure of the space to an area of a minimum bounding box of the plane structure of the space is greater than or equal to a predetermined area ratio, a third criterion in which distances from the positions corresponding to the images to all walls of the space are smaller than or equal to a reference distance, and a fourth criterion in which all walls of the space are seen from the positions corresponding to the images, and adaptively texturing the space based on the determination result.

In accordance with another embodiment in order to solve the technical problem, an adaptive three-dimensional space generation method comprises receiving a plurality of images captured from different positions in a space into an adaptive three-dimensional space generation system, and allowing the adaptive three-dimensional space generation system to perform texturing of at least a part of the walls of the space based on image information extracted from different images among the images or to perform texturing of at least a part of pixels corresponding to the floor of the space based on image information extracted from different images among the images.

The adaptive three-dimensional space generation method can be implemented by a computer program stored in a recording medium.

In accordance with an embodiment in order to solve the technical problem, an adaptive three-dimensional space generation system comprises a processor and a memory storing a program executed by the processor, wherein the program is used for determining whether the space is a first-type space or a second-type space depending on structural characteristics of the space based on a plurality of images captured from different positions in the space, adaptively selecting an image for texturing the space among the images depending on whether the space is the first-type space or the second-type space, and performing texturing of the space based on the selected image.

In accordance with another embodiment in order to solve the technical problem, an adaptive three-dimensional space generation system comprises a processor and a memory storing a program executed by the processor, wherein the program is used for receiving a plurality of images captured from different positions in a space, determining, based on the received images, whether or not at least two criteria are satisfied among a first criterion in which the number of corners of the space is smaller than or equal to a predetermined reference number, a second criterion in which a ratio of an area of a plane structure of the space with respect to an area of a minimum bounding box of the plane structure of the space is greater than or equal to a reference area ratio, a third criterion in which distances from positions corresponding to the images to all walls of the space are smaller than or equal to a standard distance, and a fourth criterion in which all walls of the space are seen from the positions corresponding to the images, and adaptively performing texturing of the space based on the determination result.

In accordance with another embodiment in order to solve the technical problem, an adaptive three-dimensional space generation system comprises a processor and a memory storing a program executed by the processor, wherein the program is used for receiving a plurality of images captured from different positions in a space, and performing texturing of at least a part of walls of the space based on image information extracted from different images among the images or performing texturing of at least a part of pixels corresponding to a floor of the space based on image information extracted from different images among the images.

In accordance with the present disclosure, the natural space modeling can be realized by adaptively performing texturing depending on the complexity of the space.

BRIEF DESCRIPTION OF THE DRAWINGS

The objects and features of the present disclosure will become apparent from the following description of embodiments, given in conjunction with the accompanying drawings, in which:

FIGS. 7 to 9 explain a method for performing texturing of a space according to another embodiment of the present disclosure;

DETAILED DESCRIPTION OF THE PREFERRED EMBODIMENTS

Figure 1:
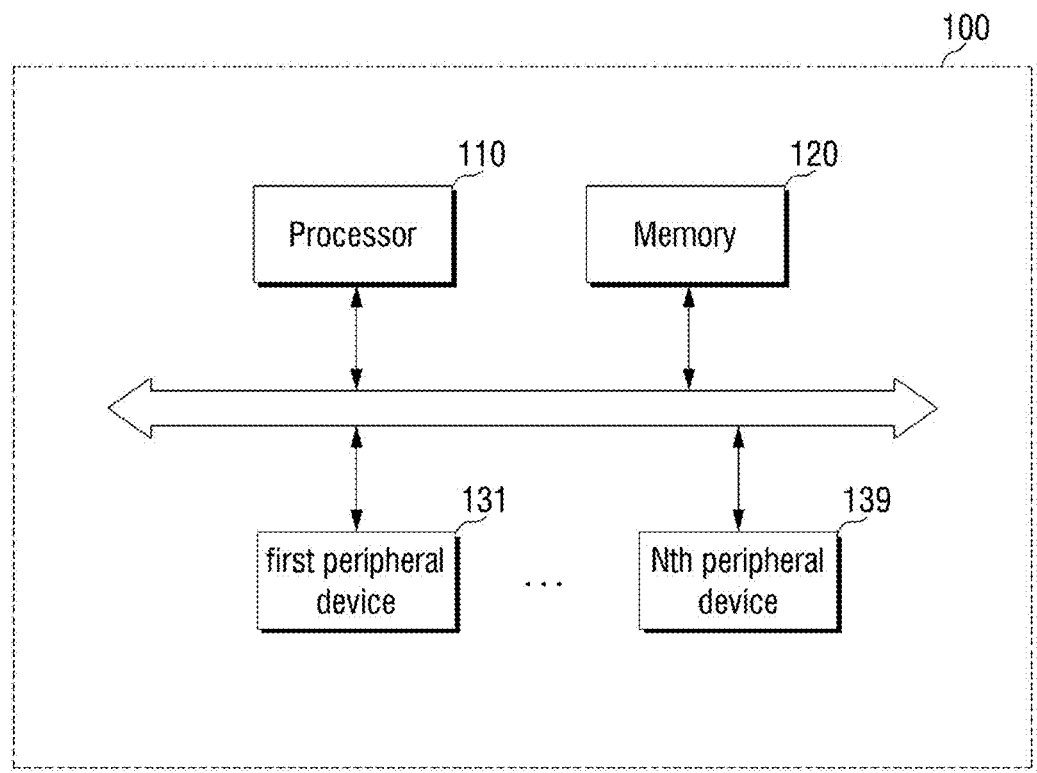
FIG. 1 explains a schematic configuration of an adaptive three-dimensional space generation system according to an embodiment of the present disclosure.

The attached drawings showing preferred embodiments of the present disclosure and the contents described in the attached drawings should be referred to in order to fully understand the present disclosure, the advantage of the operation of the present disclosure, and the object achieved by implementing the present disclosure.

It will be understood that when an element is referred to as "transmitting" data to another element, it can transmit the data to the other element directly or through at least one intervening element.

In contrast, when an element is referred to as "directly transmitting" data to another element, it transmits the data to the other element without any intervening element.

Hereinafter, embodiments of the present disclosure will be described in detail with reference to the accompanying drawings. Like reference numerals will be used for like parts throughout the drawings.

FIG. 1 explains a schematic configuration of an adaptive three-dimensional space generation system according to an embodiment of the present disclosure.

Referring to FIG. 1, an adaptive three-dimensional space generation system 100 is provided to implement an adaptive three-dimensional space generation method according to the technical idea of the present disclosure.

The adaptive three-dimensional space generation system 100 may include a memory 120 storing a program for implementing the technical idea of the present disclosure, and a processor 110 for executing the program stored in the memory 120.

It is easily conceivable to those skilled in the art that the processor 110 may be referred to as different terms such as a CPU, a mobile processor, and the like depending on the implementation of the adaptive three-dimensional space generation system 100.

The memory 120 may be implemented as any type of storage device that stores the program and allows access from the processor to drive the program. Further, the memory 120 may be implemented as a plurality of storage devices, not as any one storage device, depending on hardware implementation. Moreover, the memory 120 may include not only a main storage device but also a temporary storage device. In addition, the memory 120 may be implemented as a volatile memory or a non-volatile memory, and may be defined to include any type of information storage device that stores the program to be driven by the processor.

The adaptive three-dimensional space generation system 100 may be implemented as various devices such as a web server, a computer, a mobile phone, a tablet, a TV, a set top box, and the like depending on embodiments. The adaptive three-dimensional space generation system 100 may be defined to include any type of data processing apparatus capable of performing functions defined in this specification.

The adaptive three-dimensional space generation system 100 may further include various peripheral devices (for example, first peripheral device 131 to Nth peripheral device 139) depending on embodiments thereof. For example, it is easily conceivable to those skilled in the art that the adaptive three-dimensional space generation system 100 may further include the peripheral devices, e.g., a keyboard, a monitor, a graphic card, a communication device and the like.

The adaptive three-dimensional space generation system 100 according to the technical idea of the present disclosure can adaptively perform texturing depending on space types. The texturing may indicate a series of processes for displaying detail texture on the surfaces of the space.

For example, in the case of a space that is classified into a structurally simple space based on a predetermined criterion, it is possible to display a relatively natural space even if texturing is performed using an image captured at any one position (e.g., a 360-degree image). However, in the case of a space that is classified into a complex space based on the above criterion, it is not possible to perform texturing of the entire space using only an image captured at any one position. Even if it is possible, the texturing may be unnatural or the space may be distortedly displayed.

In order to solve the above-described problem, the adaptive three-dimensional space generation system 100 according to the technical idea of the present disclosure provides a technical idea of classifying space types based on a predetermined criterion and adaptively performing texturing of the inside of the space depending on the classified space types.

Such a technical idea will be described in detail later.

Figure 2:
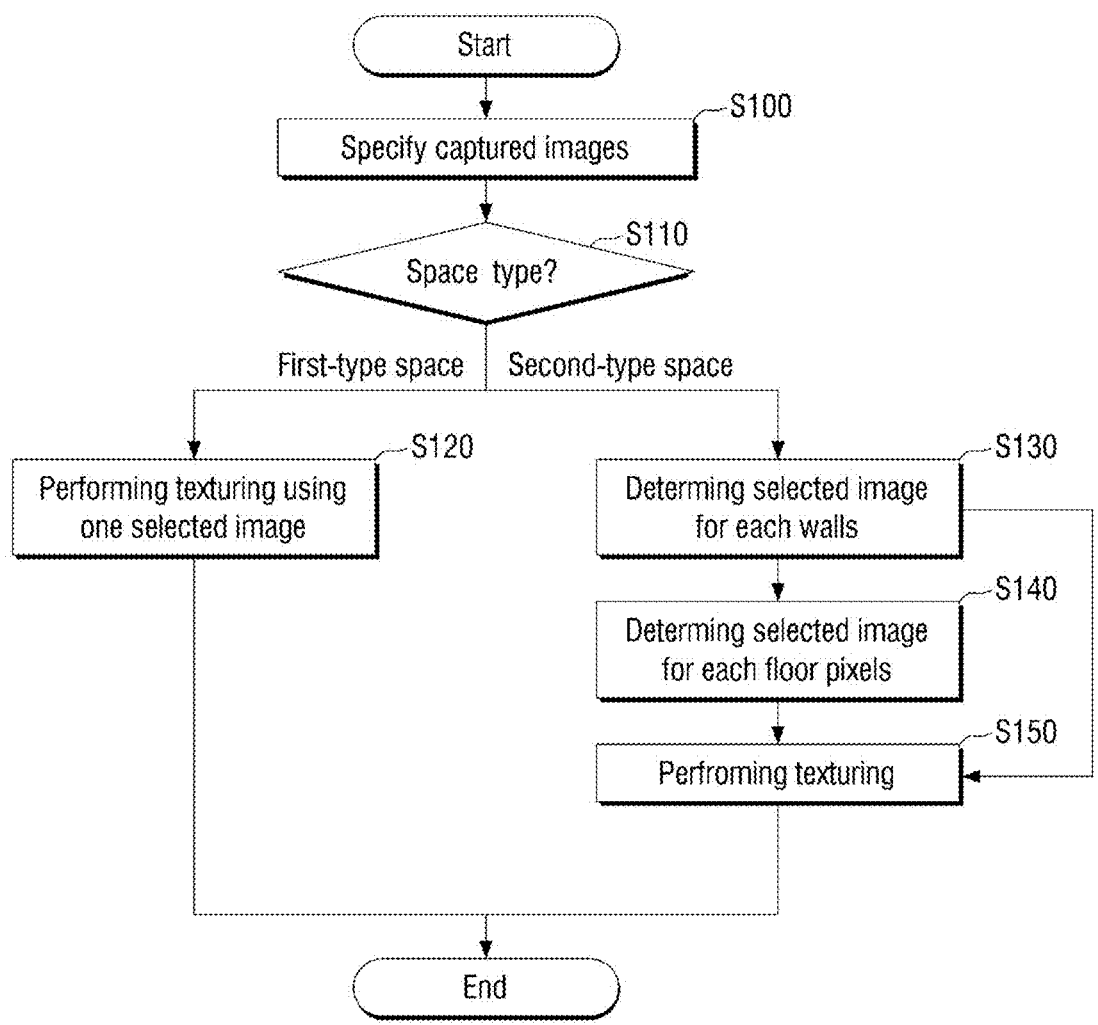
FIG. 2 is a schematic flowchart of an adaptive three-dimensional space generation method according to an embodiment of the present disclosure.

FIG. 2 is a schematic flowchart of an adaptive three-dimensional space generation method according to an embodiment of the present disclosure.

Referring to FIG. 2, the adaptive three-dimensional space generation system 100 can specify a plurality of images captured in a predetermined space to implement an adaptive three-dimensional space generation method according to the technical idea of the present disclosure (S100). Therefore, the adaptive three-dimensional space generation system 100 can receive the captured images from a user or via a network. Each of captured images may have been captured at a predetermined position in the space. Herein, the case where the adaptive three-dimensional space generation system 100 specifies the captured images may indicate the case where not only the captured images but also positions and/or directions at which the images are captured are recognized or acquired.

Each of the captured images may be, e.g., a 360-degree image. Therefore, if it is theoretically possible to display all the wall surfaces of the space using only one captured image, the entire texture of inside of the space can be obtained.

However, in the case of texturing the inside of the space using only one captured image, the texturing may be unnatural or the space may be distortedly displayed. Therefore, the space can be classified based on a predetermined criterion in order to solve the above problem.

Then, the adaptive three-dimensional space generation system 100 may classify the space into a first-type space and a second-type space (S110). Herein, the first-type space may have a relatively simple structure, and the second-type space may have a relatively complicated structure.

Then, when the space is classified into the first-type space, the adaptive three-dimensional space generation system 100 can perform the texturing of the inside of the space using one of the captured images, i.e., a selected image (S120). In one embodiment, when the space is classified into the first-type space, the adaptive three-dimensional space generation system 100 can perform texturing of the inner wall surfaces and the floor surface of the space using the selected image. In another embodiment, the texturing of the wall surfaces can be performed using one selected image, and the texturing of the floor surface can be performed using a plurality of captured images.

On the other hand, when the space is classified into the second-type space, the adaptive three-dimensional space generation system 100 can perform the texturing of the inside of the space using a plurality of captured images, i.e., a plurality of selected images.

For this purpose, the adaptive three-dimensional space generation system 100 can determine the selected images for performing the texturing of the wall surfaces (S130). In other words, the adaptive three-dimensional space generation system 100 can select, as the selected images, the captured images capable of displaying the wall surfaces clearly and with relatively less distortion or without distortion. Then, the adaptive three-dimensional space generation system 100 can extract image information for performing texturing of a corresponding wall surface (e.g., a region in the 360-degree image where the corresponding wall surface is displayed) from the selected images and perform the texturing of the corresponding wall surface using the extracted image information (S150). At this time, since the image information corresponding to the wall surface in the 360-degree image may have been corrected to be attached to a sphere, an additional image processing may be performed to re-correct the image to be a flat plane.

Further, the adaptive three-dimensional space generation system 100 can determine a selected image for the floor surface on a floor pixel basis (S140). Then, image information corresponding to a corresponding pixel (e.g., a pixel in the 360-degree image corresponding to the pixel) can be extracted from the determined selected image and used for the texturing of the floor surface (S150). This type of texturing of the floor surface can also be applied to the first-type space.

The adaptive three-dimensional space generation system 100 may use the structural characteristics of the plane of the space, i.e., the floor surface, to classify the space into the first-type space or the second-type space. Since the technical idea for modeling the floor surface from the 360-degree image has been disclosed in detail in the prior application, the detailed description thereof will be omitted herein.

The adaptive three-dimensional space generation system 100 may classify the space into the first-type space or the second-type space based on a plurality of criteria.

Figure 3:
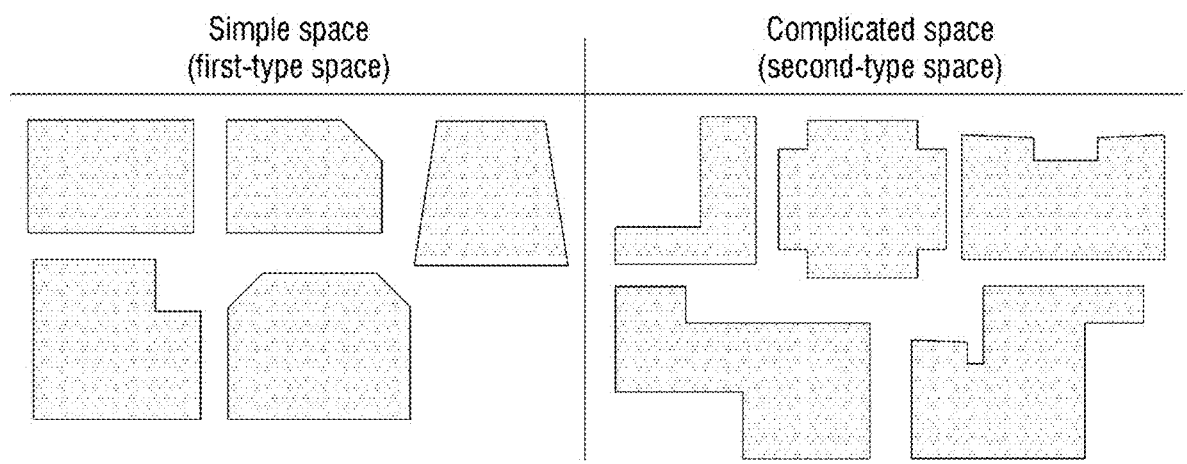
FIG. 3 explains space types according to an embodiment of the present disclosure.

FIG. 3 explains space types according to an embodiment of the present disclosure.

Figure 4:
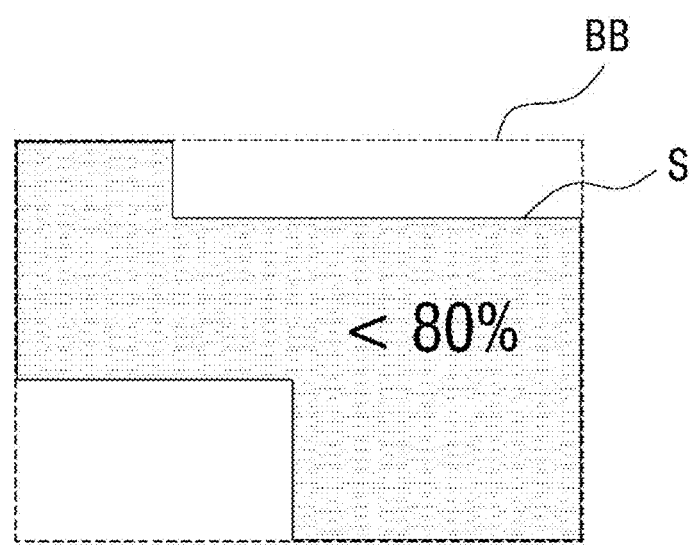
FIGS. 4 and 5 explain criteria for classifying the space types according to an embodiment of the present disclosure.
Figure 5:
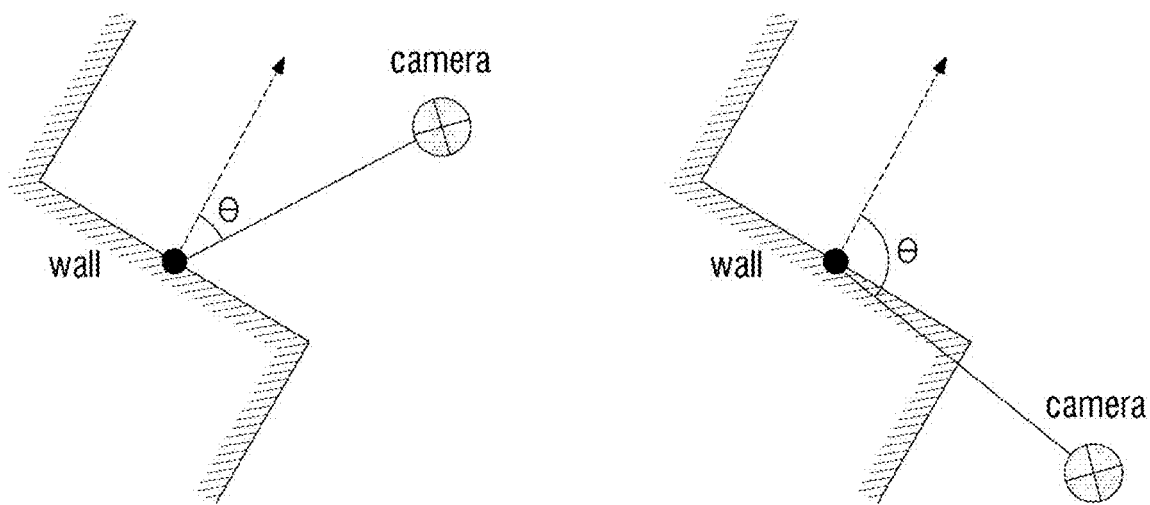

FIGS. 4 and 5 explain criteria for classifying the space types according to an embodiment of the present disclosure.

First, referring to FIG. 3, the space can be classified into a relatively simple space as shown on the left side of FIG. 3 or into a relatively complicated space as shown on the right side of FIG. 3. However, FIG. 3 shows an example rather than an absolute criterion for classifying the space types. The relatively simple space and the relatively complicated space can be classified based on the criterion to be described later.

In one embodiment of the present disclosure, the case where a relatively simple space is classified as first type and a relatively complicated space is classified as second type is described as an example. However, it is easily conceivable to those skilled in the art that the space can be classified into three or more types depending on implementations and also that different texturing techniques may be used depending on the classified space types.

As described above, the space is classified into a plurality of types in order to adaptively perform texturing depending on the space types and display a natural texture.

In accordance with the technical idea of the present disclosure, the space may be classified based on a plurality of criteria.

The first criterion may be a condition in which the number of corners in the space is smaller than or equal to a predetermined reference number. In one example, the predetermined reference number may be smaller than or equal to eight. However, the reference number may be different depending on embodiments. In accordance with an embodiment of the present disclosure, the adaptive three-dimensional space generation system 100 can specify the positions and/or the number of corners by displaying at least one of the images captured in the space on a data processing apparatus (e.g., a computer or the like) used by a user and allowing the user to directly mark the corners in the displayed space. In accordance with another embodiment, the positions and/or the number of corners can be specified by a predetermined automatic algorithm.

For example, the spaces that are displayed on the left side of FIG. 3 and classified into the first-type space may have four, five, four, six, and six corners in the order of a clockwise direction from the upper left side. The spaces that are displayed on the right side of FIG. 3 and classified into the second-type space may have six, twelve, eight, eight, and ten corners in the order of the clockwise direction from the upper left side.

The adaptive three-dimensional space generation system 100 can classify the space that satisfies the first criterion into the first-type space. The space types can also be classified based on other criteria to be described later.

The second criterion is a condition in which the distances from the positions (i.e., the camera positions) corresponding to the captured images to the walls are shorter than or equal to a predetermined reference distance. At this time, the distances from the positions to the walls may be the distances from the centers of the walls. Since the distances from the camera positions to the walls are included in the criterion for classifying the space types, when a specific wall far from the camera position exists in a space having a relatively simple structure, it is possible to solve the problem such as the distorted display of the space or the unnatural texturing which is caused by performing the texturing using both of the image of the specific wall captured at the camera position and the image of a wall relatively close to the camera position.

A third criterion may be a condition that a ratio of an area of the space to an area of a minimum bounding box is greater than or equal to a predetermined reference ratio. The reference ratio may be, e.g., 80%. However, different reference ratios may be applied depending on embodiments.

Such a criterion may be one of the criteria for determining whether or not the space has a relatively simple structure, e.g., whether or not the space is close to a rectangle, a circle, or a trapezoid. For example, the minimum bounding box of the space S may be identical with a dotted line BB in FIG. 4. Further, the ratio of the area of the space S to the area of the minimum bounding box BB may be smaller than or equal to the reference ratio.

If the spaces shown in FIG. 3 are determined based on the third criterion, all the spaces shown on the left side satisfy the third criterion, whereas some of the spaces shown on the right side (e.g., a second and a third space at the top) can satisfy the third criterion.

A fourth criterion may be a condition whether or not there is at least one position where all the walls can be seen among the positions corresponding to the captured images, i.e., the camera positions. In order to determine whether or not the fourth criterion is satisfied, the adaptive three-dimensional space generation system 100 can use an angle θ made by the line that connects the camera position and the wall and the normal line from the center of the wall. For example, in the case shown on the left side of FIG. 5, an angle θ made by a line that connects a camera position and a specific wall and a normal line from a center of the specific wall may be smaller than or equal to a predetermined reference angle (e.g., 88 degrees). On the other hand, in the case shown on the right side of FIG. 5, an angle θ made by the line that connects the camera position and the specific wall and the normal line from the center of the specific wall may be greater than or equal to the predetermined reference angle. The reference angle may be 90 degrees or less, and may be variously set depending on embodiments.

In accordance with the technical idea of the present disclosure, when all of the first, the second, the third, and the fourth criterion are satisfied, the adaptive three-dimensional space generation system 100 can classify the space into the first-type space. Otherwise, the space can be classified into the second-type space. Depending on embodiments, when only some of these criteria are satisfied, the space can be classified into the first-type space. For example, when two or more of the criteria are satisfied, the space can be classified into the first-type space. Otherwise, the space can be classified into the second-type space.

Then, in accordance with one embodiment, the adaptive three-dimensional space generation system 100 can perform texturing of the wall surfaces and the floor of the space classified into the first-type space from the image captured at any one position, and can perform texturing of the wall surfaces and the floor of the space classified into the second-type space from the images captured at a plurality of positions. In other words, the natural texturing of the first-type space can be sufficiently achieved even when only one image is used as the texturing source. On the other hand, the natural texturing of the second-type space can be achieved when a plurality of images is used as the texturing source.

In accordance with on an example, in order to determine the source of the texturing in the first-type space, i.e., the selected image, the adaptive three-dimensional space generation system 100 can determine whether or not all the walls can be seen from the positions corresponding to the captured images, i.e., the camera positions, in the ascending order of the distance from the center of the space. In order to determine whether or not all the walls can be seen, the technique described with reference to FIG. 5 may be used. The image captured at the position where all the walls can be seen and closest to the center of the space can be determined as the selected image.

Figure 6:
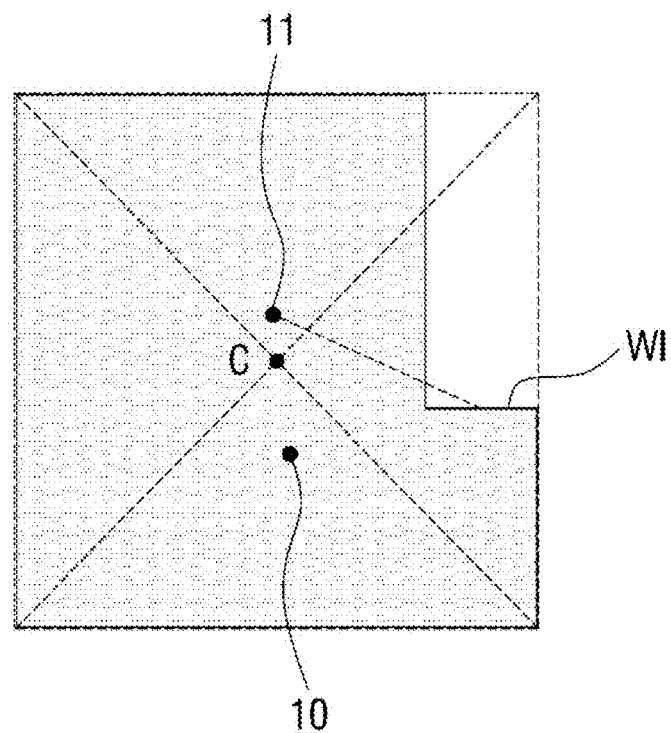
FIG. 6 explains a method for performing texturing of a space according to an embodiment of the present disclosure.

For example, FIG. 6 explains a method for performing texturing of the space according to an embodiment of the present disclosure. FIG. 6 shows, as an example, the case where a first camera position 10 and a second camera position 11 exist and the second camera position 11 is closer to the center of the space compared to the first camera position 10.

In that case, the adaptive three-dimensional space generation system 100 can determine whether or not all the walls can be seen from the camera positions in the ascending order of the distance from the center of the space C. For example, it is possible to determine whether or not all the walls can be seen from the second camera position 11. Since there is a wall WI that cannot be seen from the second camera position 11 as shown in FIG. 6, the adaptive three-dimensional space generation system 100 can determine whether or not all the walls can be seen from the first camera position 10 that is second closest to the center of the space. Since all the walls can be seen from the first camera position 10, the captured image corresponding to the first camera position 10 can be determined as the selected image. Then, the adaptive three-dimensional space generation system 100 can perform the texturing of the wall surfaces and the floor surface using the selected image. Depending on embodiments, the texturing of the floor surface can be performed using a plurality of selected images, as will be described later.

On the other hand, if the space is classified into the second-type space, the adaptive three-dimensional space generation system 100 can determine the texturing sources for each of wall surfaces among a plurality of captured images.

Further, the adaptive three-dimensional space generation system 100 can divide the floor surface into predetermined unit areas and determine the texturing sources for each of the unit areas among a plurality of captured images. In one example, the unit area may be a pixel of the floor surface. However, the present disclosure is not limited thereto, and it is also possible to divide the floor surface in a predetermined manner and determine the texturing sources for each divided area.

Such an example will be described with reference to FIGS. 7 to 9.

Figure 9:
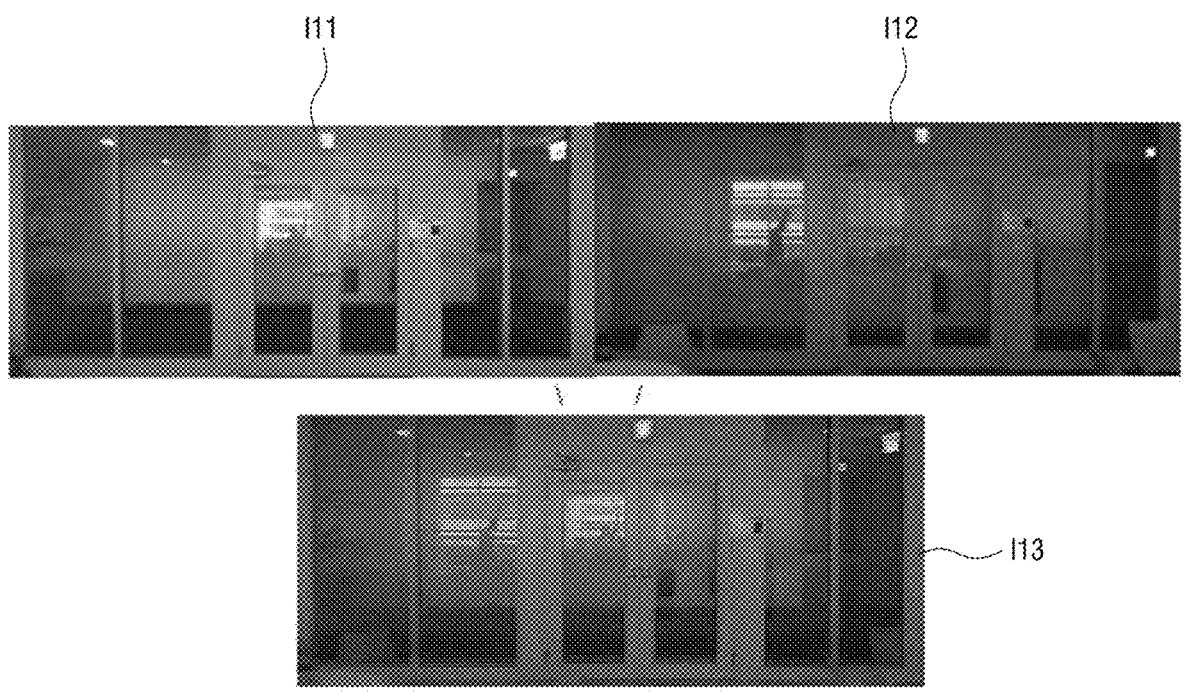

FIGS. 7 to 9 explain a method for performing texturing of a space in accordance with another embodiment of the present disclosure.

First, referring to FIG. 7, a predetermined scoring technique may be used to determine the selected images corresponding to the wall surfaces. The adaptive three-dimensional space generation system 100 can determine the texturing sources for the walls based on the distances and/or the angles between the walls and the positions corresponding to the captured images (e.g., the camera position of cam1 (camera 1), the camera position of cam2, and the camera position of cam3).

Therefore, the image sources used for performing texturing, i.e., the captured images for displaying the walls, may be different depending on the walls.

In accordance with one example, in order to determine an image source of a specific wall, i.e., a selected image (e.g., a captured image corresponding to cam 1) corresponding to the specific wall (e.g., wall 1), the adaptive three-dimensional space generation apparatus 100 can calculate a distance between the specific wall (e.g., wall 1) and a camera position (e.g., P1) corresponding to the selected image (e.g., a captured image corresponding to cam1). As described above, the distance may indicate a distance between the center of the specific wall (e.g. wall 1) and the camera position P1, and the angle may indicate an angle between the normal line from the center of the specific wall (e.g., wall 1) and the camera position P1.

The texturing can become more clear and natural by capturing the image source of the specific wall (e.g., wall 1) at a position closer to the specific wall (e.g., wall 1) and at a relatively front side.

Therefore, it is preferable that the adaptive three-dimensional space generation system 100 determines, as the image source of the specific wall (e.g., wall 1), i.e., the selected image, the image captured at the position close to the specific wall (e.g., wall 1) and at a relatively front side by applying a predetermined weight (scoring criteria).

For example, as shown in FIG. 8, the adaptive three-dimensional space generation system 100 may apply different angle weights depending on the angles θ between the specific wall (e.g., wall 1) and the camera positions. For example, as shown in FIG. 8, an angle weight of '0' may be applied when the angle θ between the specific wall (e.g., wall 1) and the camera position exceeds 88 degrees; an angle weight of '1' may be applied when the angle is within a range from 80 to 88 degrees; an angle weight of '3' may be applied when the angle is within a range from 70 to 80 degrees; and an angle weight of '6' may be applied when the angle is less than 70 degrees. However, these angle weights are examples, and the angles weights and the ranges of the angles can be varied.

Further, even if the angle is less than the predetermined angle, the specific wall may not be seen from the predetermined position. Therefore, when the specific wall (e.g., wall 1) is not seen from the camera position, e.g., when there is another wall between the specific wall (e.g., wall 1) and the camera position, a low angle weight or '0' may be applied. In other words, the captured image corresponding to the corresponding camera position is not selected as the selected image of the specific wall (e.g., wall 1).

In addition, it is possible to apply a distance weight in the ascending order of the distance between the walls and camera positions. For example, a distance weight of '4' may be applied to a camera position closest to the wall, and a distance weight of '2' may be applied to a camera position that is second closest to the wall.

In this way, an integrated weight (score) of the camera positions for the specific wall (e.g., wall 1) can be calculated based on the angle weight and/or the distance weight thus calculated. For example, the adaptive three-dimensional space generation system 100 can calculate the integrated weight by multiplying the distance weight and the angle weight.

Then, the adaptive three-dimensional space generation system 100 can determine the captured image having the highest integrated weight as the image source corresponding to the wall. In accordance with another embodiment, it is also possible to determine a plurality of captured images having the integrated weights greater than or equal to a predetermined reference value (e.g., an average value of the integration weights) as the image sources of the corresponding wall.

In the case of selecting a plurality of captured images as the image source of the specific wall, the adaptive three-dimensional space generation system 100 can extract areas corresponding to the specific wall from the selected captured images (and perform image processing for correcting the image into a predetermined plane, if necessary) and use the extracted areas, i.e., the blending result of the image information, for the texturing of the specific wall.

Such an example is shown in FIG. 9.

As shown in FIG. 9, the adaptive three-dimensional space generation system 100 shows the texturing result of the specific wall which is obtained when a plurality of captured images of the specific wall is determined as the image sources for texturing, i.e., the selected images.

The adaptive three-dimensional space generation system 100 can extract first image information I11 (shown on the upper left side) corresponding to the specific wall from any one selected image, and extract second image information I12 (shown on the upper right side) corresponding to the specific wall from another selected image. Then, the adaptive three-dimensional space generation system 100 can obtain the image I13 shown on the lower side of FIG. 9 by blending the first image information I11 and the second image information I12 using a predetermined technique and use the obtained image I13 for the texturing of the specific wall.

The adaptive three-dimensional space generation system 100 can perform the blending using various techniques. It is easily conceivable to those skilled in that art that the image information corresponding to the specific wall can be blended using at least one of the Gaussian blending technique, the Pyramid blending technique, and other various blending techniques.

Further, the adaptive three-dimensional space generation system 100 can perform the texturing of the floor surface. The texturing of the floor surface can be performed by dividing the floor surface into a plurality of unit areas and determining selected images for the divided unit areas.

In accordance with one embodiment of the present disclosure, the unit area may be a pixel unit. However, the unit area may be another unit area greater than the pixel which is defined by a predetermined scheme.

The adaptive three-dimensional space generation system 100 can determine the image sources for the unit areas based on whether or not the unit areas of the floor surface can be seen from the camera positions and the distance between the unit areas and the camera positions.

For example, the adaptive three-dimensional space generation system 100 can determine, as the image source for texturing, i.e., the selected image, the captured image corresponding to the camera position closet to the unit area among the camera positions where the unit areas can be seen.

Whether or not the specific unit area can be seen from the predetermined camera position can be determined depending on whether or not a straight line that connects the camera position and the specific position (e.g., the center) of the specific unit area or a straight line that connects the camera position and the pixels included in the specific unit area intersects with another wall.

Then, the adaptive three-dimensional space generation system 100 can extract the image information of the corresponding unit area from the selected images for the unit areas to perform the texturing of the floor surface.

For example, the adaptive three-dimensional space generation system 100 can generate masks for the floor surface using the selected images for the unit areas and perform the texturing of the floor surface using the masks thus generated.

Such an example will be described with reference to FIG. 10.

Figure 10:
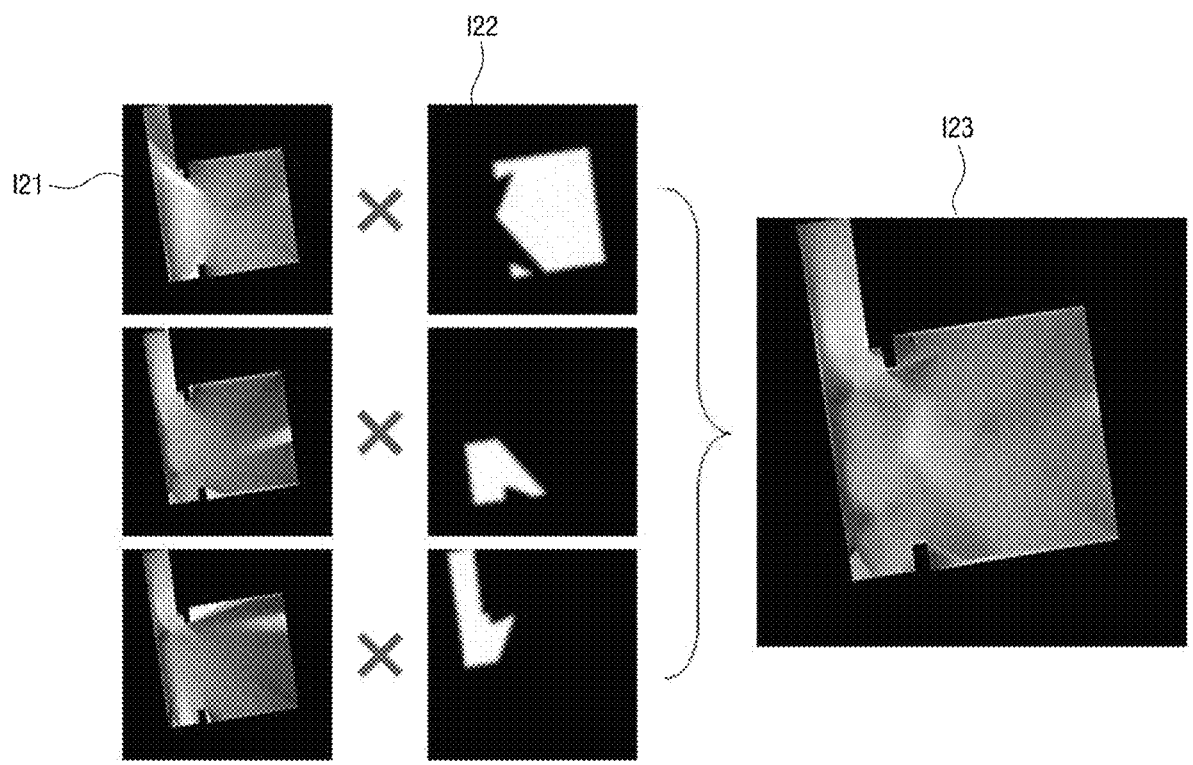
FIG. 10 explains a method for performing texturing of a floor surface according to an embodiment of the present disclosure.

FIG. 10 explains a method for performing texturing of a floor in accordance with an embodiment of the present disclosure.

Referring to FIG. 10, the image information of the floor surface extracted from the captured images corresponding to the different camera positions (e.g., cam1, cam2 and cam3) are shown as the images 121 on the leftmost side of FIG. 10.

The adaptive three-dimensional space generation system 100 can determine the selected images for the respective unit areas to generate masks (e.g., the images shown in the middle row of FIG. 10) for the selected images. For example, when the camera position 1 is determined as the selected image for the unit area (e.g., pixel) of the floor surface, 1 may be applied. Otherwise, 0 may be applied. In that case, the mask of the camera position 1 for the entire floor surface may correspond to the image I22 shown at the top of the middle row of FIG. 10. For example, if the unit area to which 1 is applied is displayed in white and the unit area to which 0 is applied is displayed in black, the mask of the camera position 1 may correspond to the image I22 shown at the top of the middle row of FIG. 10.

After the masks for the camera positions, i.e., the masks for the selected images, are generated in the above-described manner, the selected images are combined with the masks corresponding thereto by multiplication. As a result, the texture of the floor surface shown as the image I23 on the rightmost side of FIG. 10 can be generated.

The present disclosure has described the case in which the floor surface texturing method is applied to the second-type space. However, the floor surface texturing method can also be applied to the first-type space.

When the textures of the walls and the texture of the floor surface are determined, it is possible to perform the texturing of the inside of the space entirely.

Figure 11:
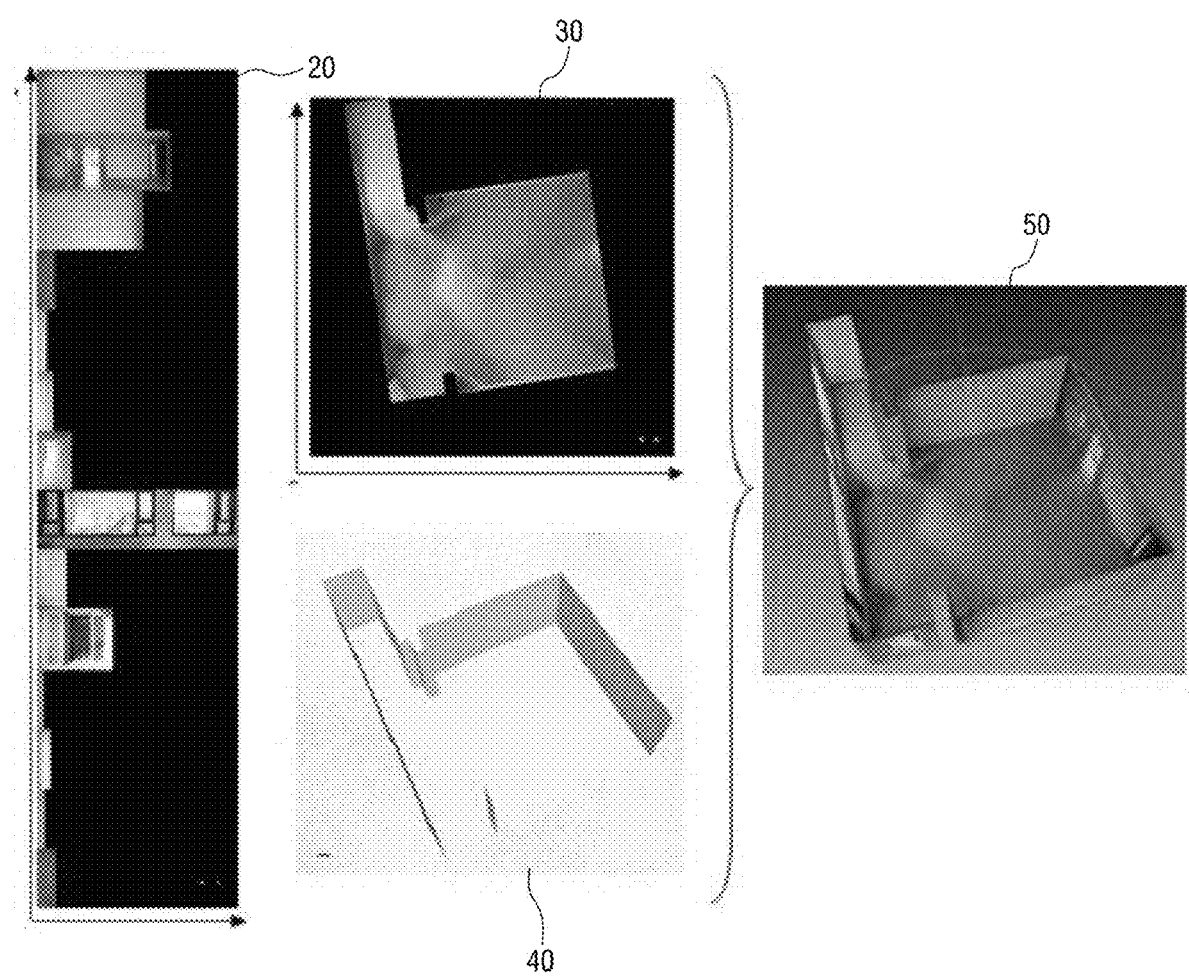
FIG. 11 shows an exemplary result of the texturing according to an embodiment of the present disclosure.

Such an example is shown in FIG. 11.

FIG. 11 shows an exemplary result of the texturing according to the embodiment of the present disclosure.

Referring to FIG. 11, an image 20 shows a state in which the textures of the walls are connected, and an image 30 shows the texture of the floor surface. Further, an image 40 shows a three-dimensional structure of the space. Since the technique for generating a three-dimensional structure of a space has been disclosed in detail in the prior application, the detailed description thereof will be omitted.

Then, the adaptive three-dimensional space generation system 100 can perform the texturing using the images 20, 30, and 40. As a result, an image 50 of the textured three-dimensional space can be obtained.

The adaptive three-dimensional space generation method according to the embodiment of the present disclosure can be implemented as a computer-readable code in a computer-readable recording medium. The computer-readable recording medium includes any type of recording device capable of storing data which is readable by a computer system. The computer-readable recording medium includes, e.g., a ROM, a RAM, a CD-ROM, a magnetic tape, a hard disk, a floppy disk, an optical data storage device, and the like, and can also be implemented as carrier waves (such as data transmission through the Internet). The computer-readable recording medium can be distributed over computer systems connected to a network so that the computer-readable codes can be stored and executed in a distributed mode. Further, functional programs, codes and code segments for achieving the present disclosure can be easily construed by programmers skilled in the art to which the present disclosure pertains.

While the present disclosure has been described with reference to the embodiment illustrated in the drawings, it is merely an example and it will be understood by those skilled in the art that various modifications and other embodiments equivalent thereto can be derived therefrom. Therefore, the technical scope of the present disclosure should be defined by the technical spirit of the appended claims.

The invention claimed is:

1. An adaptive three-dimensional space generation method comprising:
allowing an adaptive three-dimensional space generation system to determine whether a space is a first-type space or a second-type space depending on structural characteristics of the space based on a plurality of images captured from different locations in the space;
allowing the adaptive three-dimensional space generation system to adaptively select an image for performing texturing of the space among the images depending on whether the space is the first-type space or the second-type space; and
performing texturing of the space based on the image selected by the adaptive three-dimensional space generation system,
wherein said determining whether the space is the first-type space or the second-type space depending on the structural characteristics of the space includes:
determining whether the space is the first-type space or the second-type space depending on whether or not at least two criteria are satisfied among a first criterion in which the number of corners of the space is smaller than or equal to a predetermined number, a second criterion in which a ratio of an area of a plane structure of the space to an area of a minimum bounding box of the plane structure of the space is greater than or equal to a reference area ratio, a third criterion in which distances from positions corresponding to the images to all walls of the space are smaller than or equal to a predetermined distance, and a fourth criterion in which whether or not all the walls of the space are seen from the positions corresponding to the images.

2. The adaptive three-dimensional space generation method of claim 1, wherein said adaptively selecting the image for performing texturing of the space among the images depending on whether the space is the first-type space or the second-type space includes:
selecting, when the adaptive three-dimensional space generation system determines that the space is the first-type space, any one image corresponding to a position where the fourth criterion is satisfied among the images as a selected image.

3. The adaptive three-dimensional space generation method of claim 2, wherein said performing the texturing of the space based on the image selected by the adaptive three-dimensional space generation system includes:
performing texturing of the space using image information corresponding to the walls of the space included in the selected image.

4. The adaptive three-dimensional space generation method of claim 1, wherein in said adaptively selecting the image for performing texturing of the space among the images depending on whether the space is the first-type space or the second-type space, a plurality of images is selected among the images when the adaptive three-dimensional space generation system determines that the space is the second-type space and,
in said performing the texturing of the space based on the image selected by the adaptive three-dimensional space generation system, texturing of at least a part of the walls of the space is performed based on image information extracted from different selected images.

5. The adaptive three-dimensional space generation method of claim 4, wherein in said adaptively selecting an image for performing texturing of the space among the images depending on whether the space is the first-type space or the second-type space, at least one image for performing texturing of the walls is selected based on at least one of a distance between the walls of the space and the positions corresponding to the images and an angle between the walls of the space and the positions corresponding to the images.

6. The adaptive three-dimensional space generation method of claim 5, wherein said selecting an image for performing texturing of the walls based on at least one of the distance between the walls of the space and the positions corresponding to the images and the angle between the walls of the space and the positions corresponding to the images includes:
selecting, as an image for performing texturing of a specific wall, at least one image in which a weight applied to the specific wall satisfies a predetermined criteria, wherein a higher weight is applied as the distances between the positions and the specific wall among the walls is shorter and as the angle between the positions and the specific wall is smaller.

7. The adaptive three-dimensional space generation method of claim 1, wherein said adaptively selecting an image for performing texturing of the space among the images depending on whether the space is the first-type space or the second-type space includes:
selecting an image for performing texturing of the floor based on distances between the positions corresponding to the images and unit areas of the floor of the space.

8. An adaptive three-dimensional space generation method comprising:
receiving a plurality of images captured from different positions in a space into an adaptive three-dimensional space generation system; and
allowing the adaptive three-dimensional space generation system to perform texturing of at least a part of the walls of the space based on image information extracted from different images among the images or to perform texturing of at least a part of pixels corresponding to the floor of the space based on image information extracted from different images among the images,
wherein said texturing of at least a part of the walls of the space based on image information extracted from different images among the images includes:
determining, based on the received images, whether or not at least two criteria are satisfied among a first criterion in which the number of corners of the space is smaller than a predetermined reference number, a second criterion in which a ratio of an area of a plane structure of the space to an area of a minimum bounding box of the plane structure of the space is greater than or equal to a predetermined area ratio, a third criterion in which distances from the positions corresponding to the images to all walls of the space are smaller than or equal to a reference distance, and a fourth criterion in which all walls of the space are seen from the positions corresponding to the images, and adaptively texturing the space based on the determination result.

9. An adaptive three-dimensional space generation system comprising:
a processor; and
a memory storing a program executed by the processor,
wherein the program is used for determining whether the space is a first-type space or a second-type space depending on structural characteristics of the space based on a plurality of images captured from different positions in the space, adaptively selecting an image for texturing the space among the images depending on whether the space is the first-type space or the second-type space, and performing texturing of the space based on the selected image,
wherein the program is used for receiving a plurality of images captured from different positions in a space, determining, based on the received images, whether or not at least two criteria are satisfied among a first criterion in which the number of corners of the space is smaller than or equal to a predetermined reference number, a second criterion in which a ratio of an area of a plane structure of the space with respect to an area of a minimum bounding box of the plane structure of the space is greater than or equal to a reference area ratio, a third criterion in which distances from positions corresponding to the images to all walls of the space are smaller than or equal to a standard distance, and a fourth criterion in which all walls of the space are seen from the positions corresponding to the images, and adaptively performing texturing of the space based on the determination result.

10. The adaptive three-dimensional space generation system of claim 9,
wherein the program is used for receiving a plurality of images captured from different positions in a space, and performing texturing of at least a part of walls of the space based on image information extracted from different images among the images or performing texturing of at least a part of pixels corresponding to a floor of the space based on image information extracted from different images among the images.

\* \* \* \* \*